US010839307B2

(12) United States Patent
Pandit et al.

(10) Patent No.: US 10,839,307 B2
(45) Date of Patent: Nov. 17, 2020

(54) DATA COLLECTION FOR PREDICTIVE MAINTENANCE OF NETWORKED ASSETS LEVERAGING MOBILE MEASUREMENT DEVICES

(71) Applicant: International Business Machines Corporation, Armonk, NY (US)

(72) Inventors: Vinayaka Pandit, Bangalore (IN); Dayama Pankaj Satyanarayan, Bangalore (IN); Karthik Visweswariah, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1234 days.

(21) Appl. No.: 14/879,899

(22) Filed: Oct. 9, 2015

(65) Prior Publication Data
US 2017/0103339 A1    Apr. 13, 2017

(51) Int. Cl.
*G06N 20/00* (2019.01)
*G06F 16/29* (2019.01)
*G06F 16/21* (2019.01)
*G06F 16/9537* (2019.01)
*G06N 5/04* (2006.01)

(52) U.S. Cl.
CPC ........... *G06N 20/00* (2019.01); *G06F 16/219* (2019.01); *G06F 16/29* (2019.01); *G06F 16/9537* (2019.01); *G06N 5/04* (2013.01)

(58) Field of Classification Search
None
See application file for complete search history.

(56) References Cited

U.S. PATENT DOCUMENTS 8,413,039 B2    4/2013 Casey
8,548,606 B2    10/2013 Kashyap et al.
(Continued)

FOREIGN PATENT DOCUMENTS

WO    WO9627171         9/1996
WO    WO2012012303 A1   1/2012

OTHER PUBLICATIONS

Das et al, Adaptive Prognostic Approaches Combining Regime Identification with Equipment Operating History (Year: 2010).*
(Continued)

*Primary Examiner* — Li B. Zhen
*Assistant Examiner* — Mikayla Chubb
(74) *Attorney, Agent, or Firm* — Ference & Associates, LLC

(57) ABSTRACT

Methods and arrangements for managing data collection relating to equipment in an asset network. A model is trained based on historical data relative to equipment in the asset network, wherein the model is employed for recommending at least one action for further data collection from the equipment. The model is adapted based on inputs comprising two or more of: historical sensor data, from one or more sensors obtaining data relative to the equipment; equipment maintenance and/or replacement data; a current system state; and a geographical position of one or more individuals who report data. The adapted model is employed to recommend at least one subsequent best action for collecting data relative to the equipment. Other variants and embodiments are broadly contemplated herein.

20 Claims, 5 Drawing Sheets

(56) References Cited

U.S. PATENT DOCUMENTS

| | | | |
|---|---|---|---|
| 8,725,178 B2 | 5/2014 | Mohideen et al. | |
| 2004/0128613 A1 | 7/2004 | Sinisi | |
| 2006/0276204 A1* | 12/2006 | Simpson | H04W 99/00 |
| | | | 455/456.5 |
| 2006/0288014 A1 | 12/2006 | Edwards et al. | |
| 2010/0083056 A1* | 4/2010 | Spier | G05B 23/0275 |
| | | | 714/47.3 |
| 2013/0231969 A1 | 9/2013 | Van Pelt et al. | |
| 2014/0171097 A1 | 6/2014 | Fischer et al. | |
| 2014/0282015 A1 | 9/2014 | Nixon et al. | |

OTHER PUBLICATIONS

Verma et al, Windows Mobile and Tablet App for Acoustic Signature Based Machine Health Monitoring (Year: 2013).*

Camci, Maintenance scheduling of geographically distributed assets with prognostics information (Year: 2015).*

Madge et al, In search of the optimum test set—adaptive test methods for maximum defect coverage and lowest test cost (Year: 2004).*

Camci et al, Methodologies for Integration of PHM Systyems with Maintenance Data (Year: 2010).*

Huynh et al, Adaptive condition-based maintenance decision framework for deteriorating systems operating under variable environment and uncertain condition monitoring, (Year: 2012).*

Zirkel et al, A Process for Identifying Predictive Correlation Patterns in Service Management Systems (Year: 2010).*

Camci, Maintenance scheduling of geographically distributed assets with prognostic information (Year: 2015).*

Liu et al, Ambiguous decision trees for mining concept-drifting data streams (Year:2009).*

Cahill, Jim, "Early Detection of Impending Pump Failures", Emerson Process Experts Blog, 2015, 15 pages, Copy available at: http://www.emersonprocessxperts.com/2015/01/early-detection-impending-pump-failures/#.VNMkcGN5Hh9, Accessed on Oct. 7, 2015.

Karger, David R. et al., "Budget-Optimal Task Allocation for Reliable Crowdsourcing Systems", Operations Research 62.1, Mar. 26, 2013, 38 pages.

Singla, Adish, et al., "Incentives for Privacy Tradeoff in Community Sensing", Association for the Advancement of Artificial Intelligence (AAAI), Jul. 14-18, 2013, Bellevue, Washington, US, 9 pages.

* cited by examiner

DATA COLLECTION FOR PREDICTIVE MAINTENANCE OF NETWORKED ASSETS LEVERAGING MOBILE MEASUREMENT DEVICES

BACKGROUND

Generally, large industrial plants are essentially networks of assets with complex relationships between them that facilitate smooth functioning. Often, some of these relationships are known in advance, but some of the unknown relationships need to be learned on the basis of operational data. The predictive (as opposed to proactive or reactive) maintenance of such industrial assets requires gathering the right kind and amount of data about their operations, learning unknown relationships, and—in conjunction with known relationships—taking timely decisions on assets that require maintenance attention.

Ideally, all assets in a plant (e.g., various types of physical equipment or other components that may be employed in the functioning of a plant) would be designated as "preferred" for maintenance purposes so that they are monitored on a continual basis via sensors and other forms of instrumentation. However, this is cost-prohibitive in view of the number and extent of sensors or other instruments that might be needed. Large industrial plants have normally employed mobile and ad-hoc data collection techniques, as performed on assets, for the purpose of predictive maintenance, thus sacrificing a significant degree of timeliness, thoroughness and coverage in the process. This results either in failure to detect impending failures or late detection of an error; either way, this results in greater damage to the assets.

BRIEF SUMMARY

In summary, one aspect of the invention provides a method of managing data collection relating to equipment in an asset network, said method comprising: utilizing at least one processor to execute computer code that performs the steps of: training a model based on historical data relative to equipment in the asset network, wherein the model is employed for recommending at least one action for further data collection from the equipment; adapting the model based on inputs comprising two or more of: historical sensor data, from one or more sensors obtaining data relative to the equipment; equipment maintenance and/or replacement data; a current system state; and a geographical position of one or more individuals who report data; and employing the adapted model to recommend at least one subsequent best action for collecting data relative to the equipment.

Another aspect of the invention provides an apparatus for managing data collection relating to equipment in an asset network, said apparatus comprising: at least one processor; and a computer readable storage medium having computer readable program code embodied therewith and executable by the at least one processor, the computer readable program code comprising: computer readable program code configured to train a model based on historical data relative to equipment in the asset network, wherein the model is employed for recommending at least one action for further data collection from the equipment; computer readable program code configured to adapt the model based on inputs comprising two or more of: historical sensor data, from one or more sensors obtaining data relative to the equipment; equipment maintenance and/or replacement data; a current system state; and a geographical position of one or more individuals who report data; and computer readable program code configured to employ the adapted model to recommend at least one subsequent best action for collecting data relative to the equipment.

An additional aspect of the invention provides a computer program product for managing data collection relating to equipment in an asset network, said computer program product comprising: a computer readable storage medium having computer readable program code embodied therewith, the computer readable program code comprising: computer readable program code configured to train a model based on historical data relative to equipment in the asset network, wherein the model is employed for recommending at least one action for further data collection from the equipment; computer readable program code configured to adapt the model based on inputs comprising two or more of: historical sensor data, from one or more sensors obtaining data relative to the equipment; equipment maintenance and/or replacement data; a current system state; and a geographical position of one or more individuals who report data; and computer readable program code configured to employ the adapted model to recommend at least one subsequent best action for collecting data relative to the equipment.

A further aspect of the invention provides a method comprising: training a model based on historical data relative to equipment in an asset network, wherein the model is employed for recommending at least one action; wherein said training comprises learning rules and/or patterns based on the historical data; adapting the model based on inputs comprising: historical sensor data; equipment maintenance and/or replacement data; a current system state; and a geographical position of one or more individuals who report data; wherein the geographical position of each of the one or more individuals who report data comprises determining a geographical position of one or more mobile devices; and employing the adapted model to recommend at least one subsequent best action; wherein the recommended at least one subsequent best action includes: a decision on whether to collect data using a mobile device; and a decision on at least one of: equipment from which to collect data; and a data collection time.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
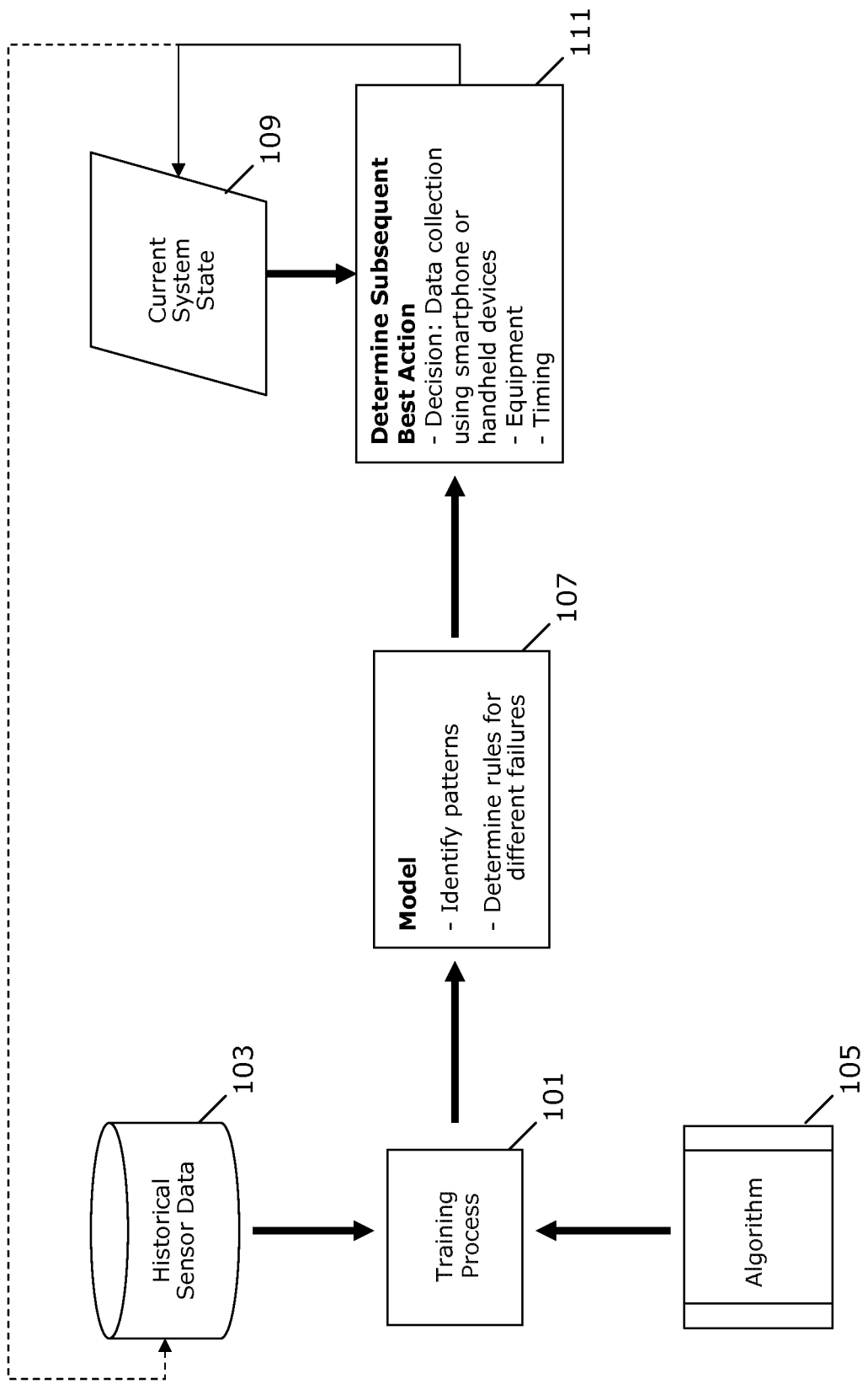
FIG. 1 schematically illustrates a method of data collection.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention, are methods and arrangements which provide dynamic and adaptive mechanisms for mobile data collection, relative to aspects of reliability and maintenance in a network of assets. This can involve exploiting discovered relationships between given measurements and instances of equipment failure. Stated another way, there is broadly contemplated herein a dynamic, cost-effective, enterprise-mobile aware, and data driven approach for collecting condition data of the assets so as to enable timely and reliable decisions on preventive maintenance of the assets of a large industrial plant.

The features discussed above, and others, relating to at least one embodiment of the invention, will be better appreciated from the discussion which follows Broadly contemplated herein, in accordance with at least one embodiment of the invention, are methods and arrangements for developing a dynamic and adaptive schedule for equipment-related data collection based on discovered relationships between parameters and failure patterns across the asset network in a plant so as to reduce the cost of data collection and accelerate the process of problem identification by exploiting relationships in the failure/anomaly patterns across equipment and exploiting the knowledge of geo-positioning of the employees with respect to assets and to an increasing rate of enterprise mobile adaptation. To these ends, the schedule can be dynamic and adaptive based on measurements. Further, the increasing use of smart phones by enterprise employees, and corresponding enterprise applications that companies are increasingly rolling out for the employees, can be leveraged to a great extent by way of the methods and arrangements broadly contemplated herein.

A sample use-case, in accordance with at least one embodiment of the invention, can involve operation of a refinery; it should be understood that a great variety of other possible settings are broadly contemplated herein. Generally, it can be noted that in refinery operation, maintenance of rotating equipment and connecting pipelines can be very critical. Process parameters and operating conditions for some of the equipment (e.g., compressors) may be monitored online while for others (e.g., pumps), only vibration data may need to be collected, e.g., via mobile devices or other handheld measuring equipment. An associated challenge can thus involve developing a dynamic and condition-based schedule for collecting vibration data from various points of choice, so as to identify faults quickly and minimize overall costs. In that connection, it can be appreciated that it may be cost-prohibitive to collect data from a number of points beyond a certain level. This type of challenge, and others, can be addressed in one or more manners as broadly contemplated herein, and as now may be appreciated from the ensuing discussion and related figures.

FIG. 1 schematically illustrates a method of data collection, in accordance with at least one embodiment of the invention. As shown, a training process 101 can incorporate historical sensor data 103, guided by a predetermined algorithm 105. The historical sensor data 101 can include measurements and readings from a variety of equipment at different locations within a plant or other industrial operation; since a variety of readings taken over time can be input here, it can be appreciated that a significant amount of data may come to be available. The algorithm 105 can be configured to process the data in essentially any desired manner to help develop a model 107 (to be described in more detail herebelow). Such an algorithm can include or incorporate, without necessarily being limited to, sequence rule mining and decision trees.

In accordance with at least one embodiment of the invention, the model 107 can be developed in a manner (as guided by the training process 101 driven by algorithm 105) to identify patterns from among the historical data 103. To this end, to the extent one or more items of equipment may have failed in the past (and thus may be included in the historical data 101), the model 107 may identify or discern rules for different failures. With input also provided from one or more aspects of the current system state 109, a subsequent best action can then be determined (111). This determination can help hone down a limited number of measures that may need to be taken in order to accurately predict and potentially forestall equipment failure (and/or or one or more other system or equipment contingencies), as opposed to potentially taking a much larger number of measures that may end up being cost-prohibitive. Accordingly, one or more subsequent best actions can include, but by no means need to be limited to: determining whether additional data collection can involve a smartphone or other handheld device; determining which equipment to measure; and determining one or more timepoints at which to take one or more measurements. Any action thereby undertaken can then be fed back to update the current system state (109) and by extension may also be included as part of the historical sensor data 103.

Figure 2:
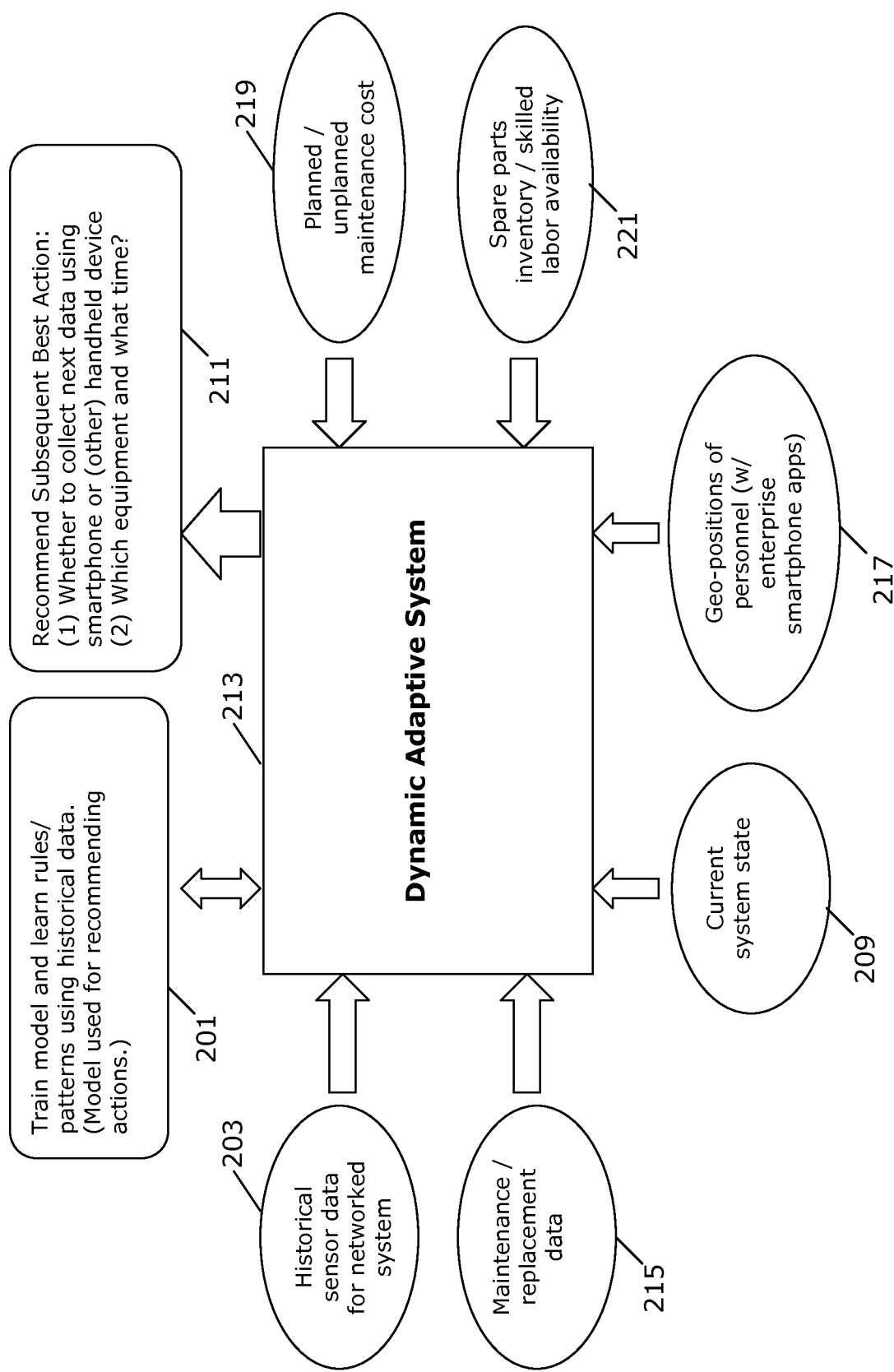
FIG. 2 schematically illustrates a dynamic adaptive system for data collection.

FIG. 2 schematically illustrates a dynamic adaptive system for data collection, in accordance with at least one embodiment of the invention. This can be considered an expanded, more holistic variant of the system shown in FIG. 1; reference numerals indicating similar or analogous components as in FIG. 1 are advanced by 100. As such, a dynamic adaptive system 213 for recommending a subsequent best action (211) can have several inputs. Similar to the system of FIG. 1, the system 213 can incorporate historical sensor data for a network (e.g., of equipment and/or other assets) and a current system state 209. Additional inputs can include data on maintaining or replacing equipment (215), geographical positions (or "geo-positions") of personnel with enterprise smartphone applications (217), maintenance costs (planned for unplanned) 219, and any data relating to spare parts inventory and/or skilled labor availability (221). Thus, a model can be trained (201) as discussed heretofore with respect to FIG. 1, and the dynamic adaptive system 213 can accept any and all of the noted inputs, with the aforementioned model applied thereto, towards recommending a subsequent best action (211), as also discussed heretofore with respect to FIG. 1.

Figure 3:
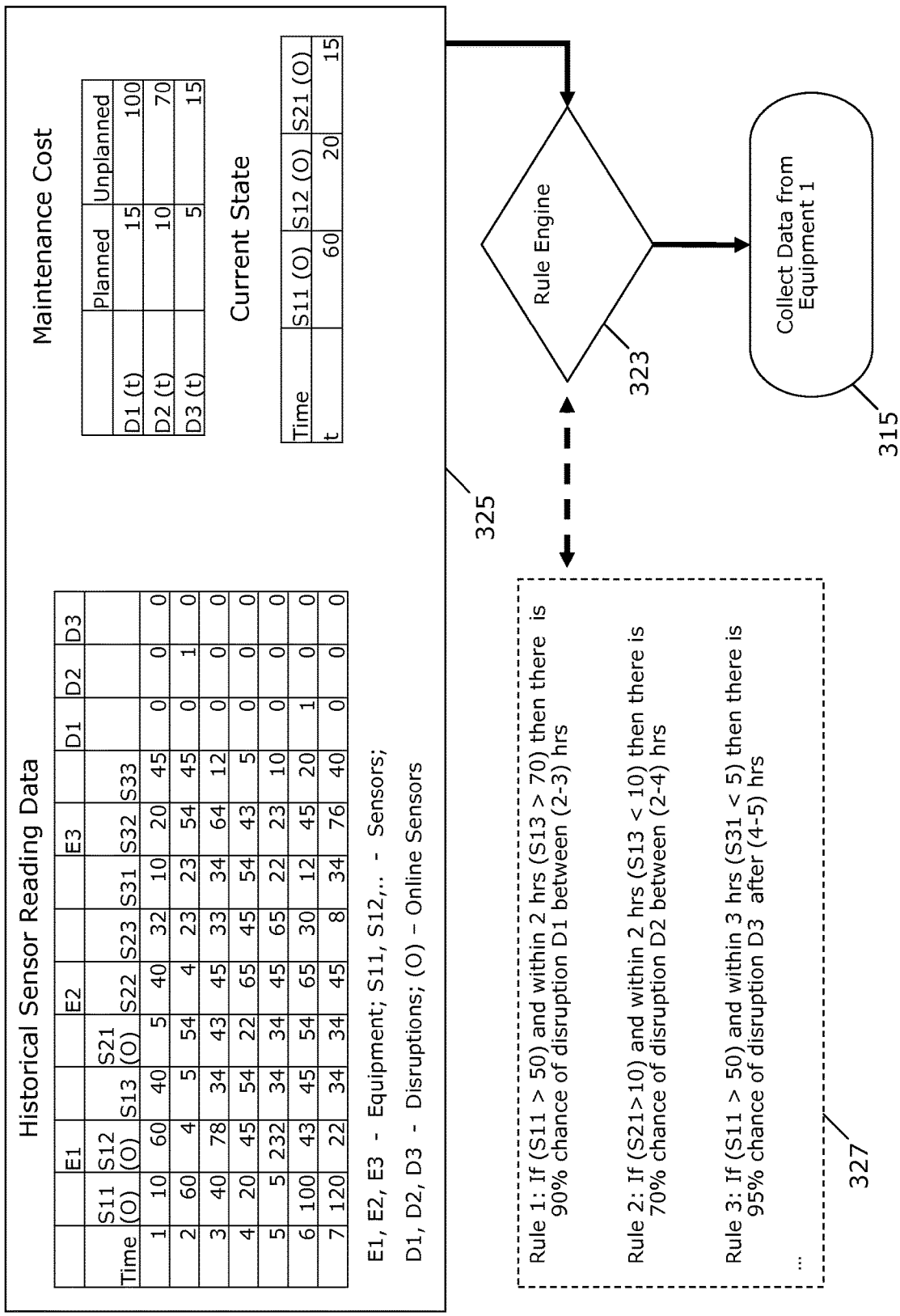
FIG. 3 schematically illustrates operation of a rule engine for determining a manner of a data collection.

FIG. 3 schematically illustrates operation of a rule engine for determining a manner of a data collection, in accordance with at least one embodiment of the invention. Such a rule engine 323 can be used, e.g., by a dynamic adaptive system such as that (213) in FIG. 2, to produce a recommendation for a subsequent best action. As shown, input data 325 can include historical sensor reading data, data on maintenance costs and a current system state. The rule engine 323 may be governed by a set of predetermined rules 327 as shown. Based on applying the rules to the input data 325, a subsequent best action 315 can be output as shown.

It can be appreciated from the foregoing that, in accordance with at least one embodiment of invention, a technical improvement is represented at least via methods and arrangements which provide dynamic and adaptive mechanisms for mobile data collection, relative to aspects of reliability and maintenance in a network of assets.

In accordance with at least one embodiment of the invention, very generally, quantitative values as determined herein, or other data or information as used or created herein, can be stored in memory or displayed to a user on a screen, as might fit the needs of one or more users.

Figure 4:
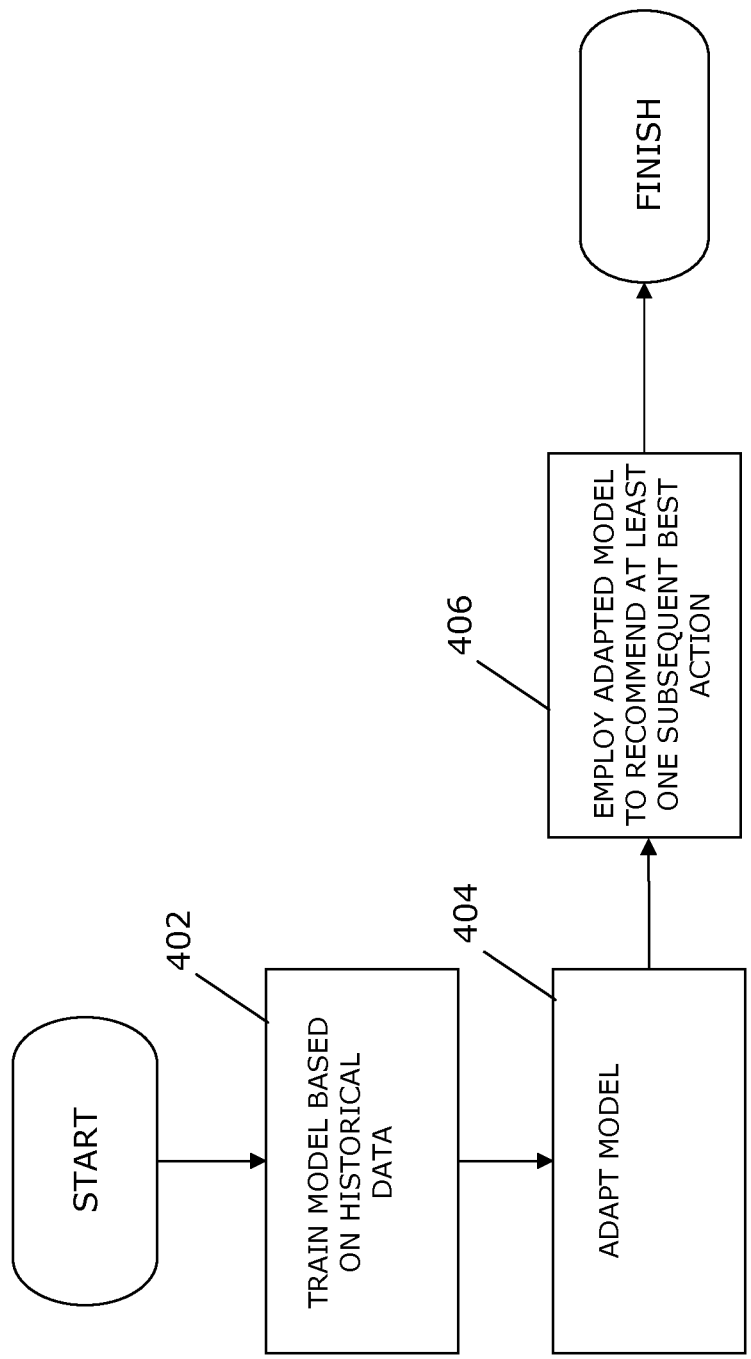
FIG. 4 schematically illustrates a general process for equipment data collection.

FIG. 4 sets forth a process more generally for managing data collection relating to equipment in an asset network, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a model is trained based on historical data relative to equipment in the asset network, wherein the model is employed for recommending at least one action for further data collection from the equipment (402). The model is adapted based on inputs comprising two or more of: historical sensor data, from one or more sensors obtaining data relative to the equipment; equipment maintenance and/or replacement data; a current system state; and a geographical position of one or more individuals who report data (404). The adapted model is employed to recommend at least one subsequent best action for collecting data relative to the equipment (406).

Figure 5:
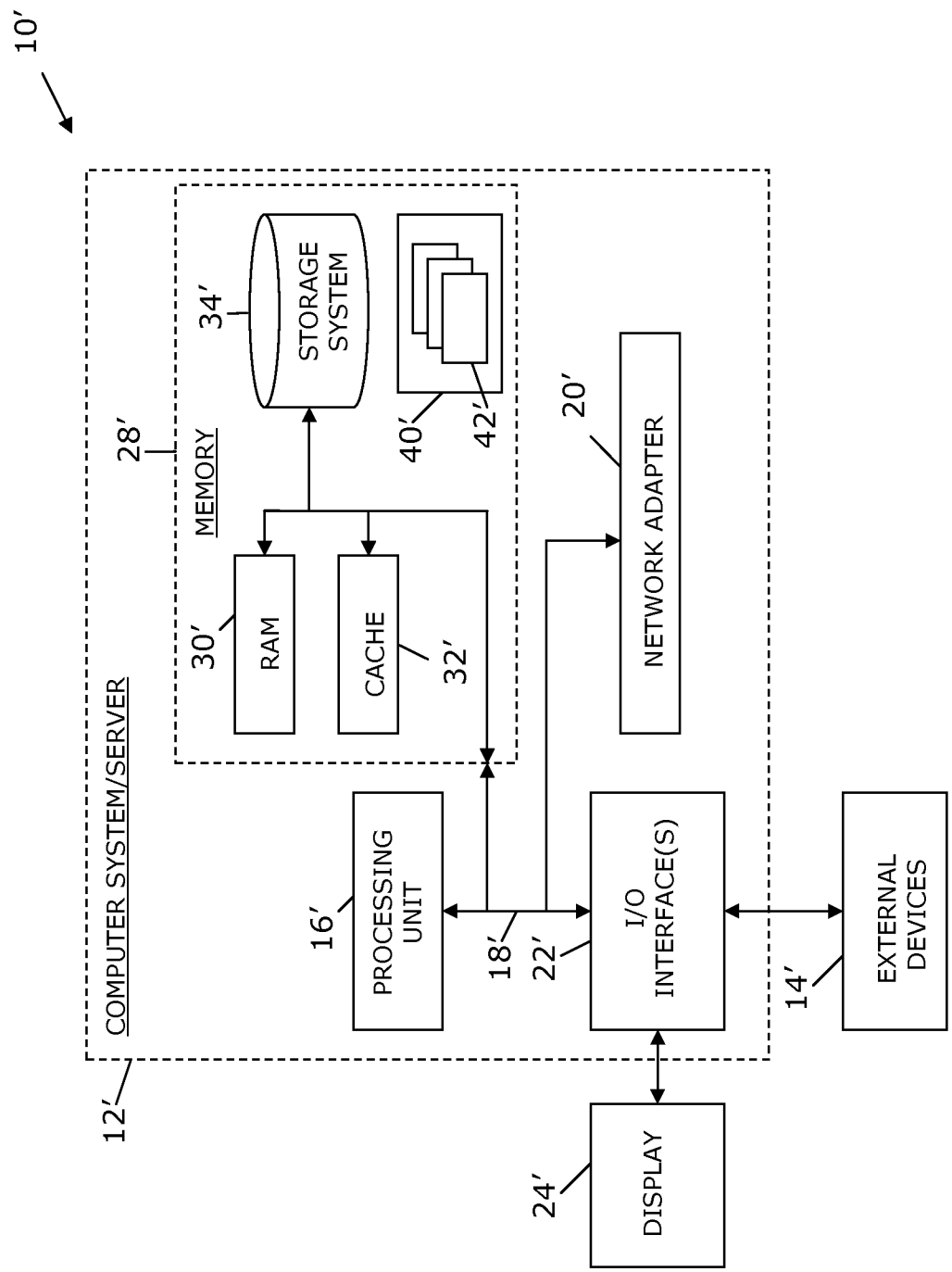
FIG. 5 illustrates a computer system.

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing data collection relating to equipment in an asset network, said method comprising:
utilizing at least one processor to execute computer code that performs the steps of:
training a model using historical data relative to a plurality of equipment in the asset network, wherein the trained model comprises a dynamically adaptable model based upon new inputs, wherein the training is guided by a predetermined algorithm incorporating sequence rule mining and decision trees, wherein the model is employed for recommending at least one action for further data collection from the plurality of equipment, thereby reducing a cost in collecting data from the equipment while maintaining equipment failure recognition, wherein the trained model identifies relationships between parameters and failure patterns across the plurality of equipment in the asset network, wherein the trained model discerns rules for equipment failures based upon the historical data and the new inputs;
dynamically adapting the model based on inputs comprising two or more of: historical sensor data, from one or more sensors obtaining data relative to the equipment; equipment maintenance and/or replacement data; a current system state; and a geographical position of one or more individuals who report data; and
employing the adapted model to recommend at least one subsequent best action for collecting data relative to the plurality of equipment, wherein the at least one subsequent best action comprises identifying a piece of data to be collected to predict an equipment failure and reducing an overall number of pieces of data required for the prediction, wherein the employing comprises receiving input at the trained model corresponding to a current system state, wherein the trained model utilizes the current system state to recommend the at least one subsequent best action.

2. The method according to claim 1, wherein said adapting comprises adapting the model based on inputs comprising a geographical position of one or more individuals who report data.

3. The method according to claim 2, wherein the geographical position of each of the one or more individuals who report data comprises a geographical position of one or more mobile devices.

4. The method according to claim 1, wherein said adapting comprises adapting the model based on inputs comprising all of: historical sensor data; equipment maintenance and/or replacement data; a current system state; and a geographical position of one or more individuals who report data.

5. The method according to claim 1, wherein said adapting comprises adapting the model based on inputs comprising one or more of: planned and/or unplanned equipment maintenance costs; and inventory of spare parts and/or skilled labor.

6. The method according to claim 1, wherein said training comprises learning rules and/or patterns based on the historical data.

7. The method according to claim 1, wherein the recommended at least one subsequent best action includes a decision on whether to collect data using a mobile device.

8. The method according to claim 7, wherein the mobile device comprises a smartphone or other mobile handheld device.

9. The method according to claim 1, wherein the recommended at least one subsequent best action includes a decision on at least one of: equipment from which to collect data; and a data collection time.

10. An apparatus for managing data collection relating to equipment in an asset network, said apparatus comprising:
at least one processor; and
a computer readable storage medium having computer readable program code embodied therewith and executable by the at least one processor, the computer readable program code comprising:

computer readable program code configured to train a model using historical data relative to a plurality of equipment in the asset network, wherein the trained model comprises a dynamically adaptable model based upon new inputs, wherein the training is guided by a predetermined algorithm incorporating sequence rule mining and decision trees, wherein the model is employed for recommending at least one action for further data collection from the plurality of equipment, thereby reducing a cost in collecting data from the equipment while maintaining equipment failure recognition, wherein the trained model identifies relationships between parameters and failure patterns across the plurality of equipment in the asset network, wherein the trained model discerns rules for equipment failures based upon the historical data and the new inputs;

computer readable program code configured to dynamically adapt the model based on inputs comprising two or more of: historical sensor data, from one or more sensors obtaining data relative to the equipment; equipment maintenance and/or replacement data; a current system state; and a geographical position of one or more individuals who report data; and computer readable program code configured to employ the adapted model to recommend at least one subsequent best action for collecting data relative to the plurality of equipment, wherein the at least one subsequent best action comprises identifying a piece of data to be collected to predict an equipment failure and reducing an overall number of pieces of data required for the prediction, wherein the employing comprises receiving input at the trained model corresponding to a current system state, wherein the trained model utilizes the current system state to recommend the at least one subsequent best action.

11. A computer program product for managing data collection relating to equipment in an asset network, said computer program product comprising:

a computer readable storage medium having computer readable program code embodied therewith, the computer readable program code comprising:

computer readable program code configured to train a model using historical data relative to a plurality of equipment in the asset network, wherein the trained model comprises a dynamically adaptable model based upon new inputs, wherein the training is guided by a predetermined algorithm incorporating sequence rule mining and decision trees, wherein the model is employed for recommending at least one action for further data collection from the plurality of equipment, thereby reducing a cost in collecting data from the equipment while maintaining equipment failure recognition, wherein the trained model identifies relationships between parameters and failure patterns across the plurality of equipment in the asset network, wherein the trained model discerns rules for equipment failures based upon the historical data and the new inputs;

computer readable program code configured to dynamically adapt the model based on inputs comprising two or more of: historical sensor data, from one or more sensors obtaining data relative to the equipment; equipment maintenance and/or replacement data; a current system state; and a geographical position of one or more individuals who report data; and computer readable program code configured to employ the adapted model to recommend at least one subsequent best action for collecting data relative to the plurality of equipment, wherein the at least one subsequent best action comprises identifying a piece of data to be collected to predict an equipment failure and reducing an overall number of pieces of data required for the prediction, wherein the employing comprises receiving input at the trained model corresponding to a current system state, wherein the trained model utilizes the current system state to recommend the at least one subsequent best action.

12. The computer program product according to claim 11, wherein the adapting comprises adapting the model based on inputs comprising a geographical position of one or more individuals who report data.

13. The computer program product according to claim 12, wherein the geographical position of each of the one or more individuals who report data comprises a geographical position of one or more mobile devices.

14. The computer program product according to claim 11, wherein said adapting comprises adapting the model based on inputs comprising all of: historical sensor data; equipment maintenance and/or replacement data; a current system state; and a geographical position of one or more individuals who report data.

15. The computer program product according to claim 11, wherein said adapting comprises adapting the model based on inputs comprising one or more of: planned and/or unplanned equipment maintenance costs; and inventory of spare parts and/or skilled labor.

16. The computer program product according to claim 11, wherein said training comprises learning rules and/or patterns based on the historical data.

17. The computer program product according to claim 11, wherein the recommended at least one subsequent best action includes a decision on whether to collect data using a mobile device.

18. The computer program product according to claim 17, wherein the mobile device comprises a smartphone or other mobile handheld device.

19. The computer program product according to claim 11, wherein the recommended at least one subsequent best action includes a decision on at least one of: equipment from which to collect data; and a data collection time.

20. A method comprising:

training a model using historical data relative to a plurality of equipment in an asset network, wherein the trained model comprises a dynamically adaptable model based upon new inputs, wherein the training is guided by a predetermined algorithm incorporating sequence rule mining and decision trees, wherein the model is employed for recommending at least one action, thereby reducing a cost in collecting data from the equipment while maintaining equipment failure recognition, wherein the trained model identifies relationships between parameters and failure patterns across the plurality of equipment in the asset network;

wherein said training comprises discerning rules and/or patterns based on the historical data;

dynamically adapting the model based on inputs comprising: historical sensor data; equipment maintenance and/or replacement data; a current system state; and a geographical position of one or more individuals who report data;

wherein the geographical position of each of the one or more individuals who report data comprises determining a geographical position of one or more mobile devices; and employing the adapted model to recommend at least one subsequent best action, wherein the at least one subsequent best action comprises identifying a piece of data to be collected to predict an equipment failure and reducing an overall number of pieces of data required for the prediction, wherein the employing comprises receiving input at the trained model corresponding to a current system state, wherein the trained model utilizes the current system state to recommend the at least one subsequent best action;

wherein the recommended at least one subsequent best action includes:

a decision on whether to collect data using a mobile device; and a decision on at least one of: equipment from which to collect data; and a data collection time.

* * * * *